United States Patent [19]

Kurz et al.

[11] 4,309,167
[45] Jan. 5, 1982

[54] METHOD AND APPARATUS FOR INTRODUCING A CABLE INTO A VULCANIZATION CHAMBER

[75] Inventors: Rainer Kurz, Schattdorf; Ruedi Walther, Altdorf, both of Switzerland

[73] Assignee: Dätwyler AG, Altdorf, Switzerland

[21] Appl. No.: 159,664

[22] Filed: Jun. 16, 1980

[30] Foreign Application Priority Data

May 16, 1979 [CH] Switzerland ............... 4656/79

[51] Int. Cl.³ .................. F27B 3/22; F27D 1/18; F26B 25/00
[52] U.S. Cl. ..................... 432/22; 34/242; 432/242
[58] Field of Search ............. 432/22, 242; 34/242

[56] References Cited

U.S. PATENT DOCUMENTS 3,226,203 12/1965 Rummel .............. 34/242 X
3,428,504 2/1969 Figg ..................... 156/49
3,460,359 8/1969 Schiffer ................ 34/242

FOREIGN PATENT DOCUMENTS 505162 5/1939 United Kingdom .
1504355 3/1978 United Kingdom .
2006351 5/1979 United Kingdom .

Primary Examiner—John J. Camby
Attorney, Agent, or Firm—Steele, Gould & Fried

[57] ABSTRACT

The cable is introduced into a sealing tube containing elastic sealing elements before entering the vulcanization chamber which is separated from the extruder. The elements have closed chambers which can be individually pressurized by, in each case, one line, while pressure regulation takes place by means of pressure reducing valves. Gaps can be provided between the individual chambers and they are filled by the heat transfer medium which brings about the crosslinking of the layer extruded onto cable and which passes out of the intake opening of vulcanization chamber. A leakage flow forms along the entire sealing tube and this passes through the openings of sealing elements and completely fills the annular clearance between the boundary of the opening and the cable, so that any contact between the cable and the sealing elements is at least substantially prevented. The gaps can be filled with a sealing liquid, which then forms the leakage flow instead of or together with the heat transfer medium.

21 Claims, 6 Drawing Figures

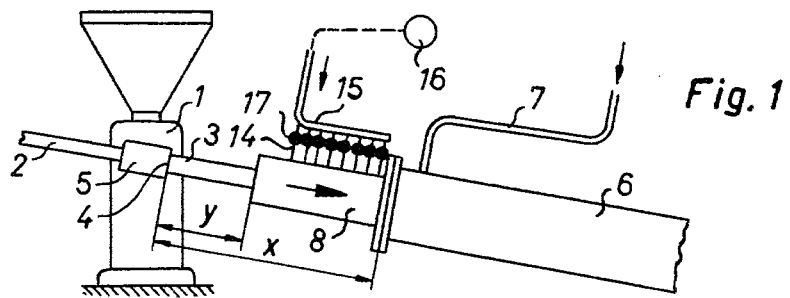
Fig. 1
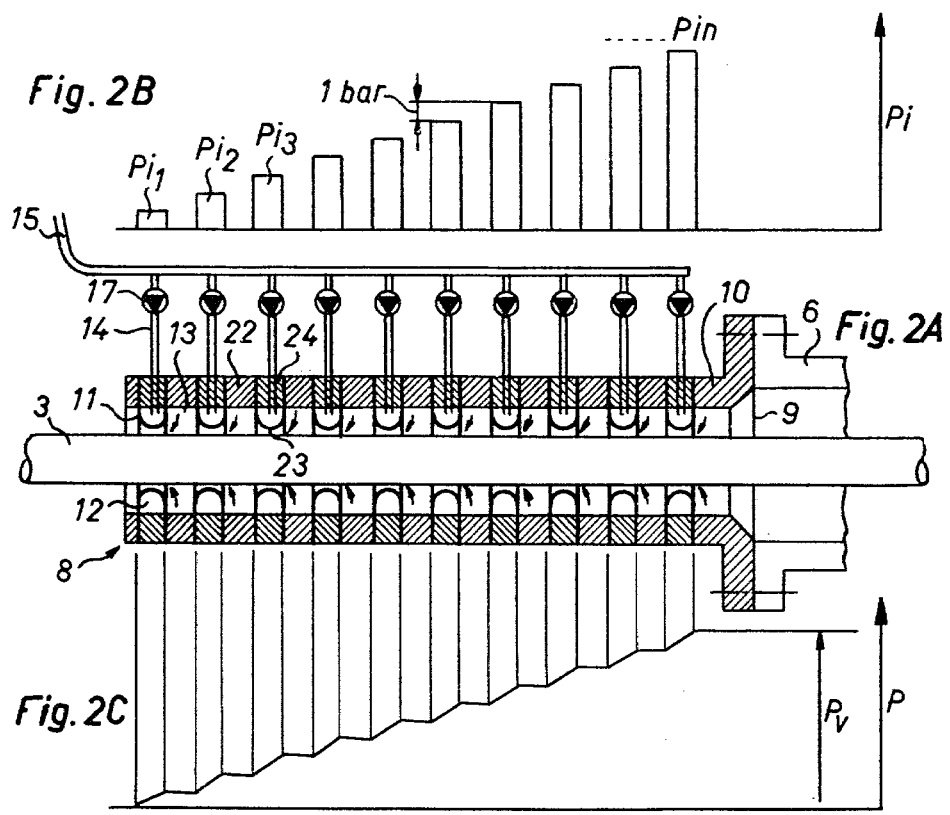
Fig. 2B
Fig. 2A
Fig. 2C
Fig. 3

4,309,167

METHOD AND APPARATUS FOR INTRODUCING A CABLE INTO A VULCANIZATION CHAMBER

BACKGROUND OF THE INVENTION

The present invention relates to a method and apparatus for introducing a cable into a vulcanization chamber.

The invention is applicable to any type of cable manufacture in which a circular or sector-shaped conductor is passed through an extruder, where it is surrounded with a layer of crosslinkable plastic, such as for example crosslinkable PE or crosslinkable rubber, e.g. EPDM-rubber and is subsequently introduced into a vulcanization chamber in which crosslinking takes place. In the case of multilayer cables, the conductor can also be passed through a plurality of extruders. Crosslinking in the vulcanization chamber takes place continuously, so that such chambers are also called the "CV-zone." Crosslinking takes place by conversion by means of a heat transfer medium, e.g. vapor, particularly water vapor, by oil or by gas.

In the known continuous crosslinking process, it is standard practice for the vulcanization chamber to be fixedly connected with the extruder head. However, this has the disadvantage that the extruded cable can only be observed when it has left the vulcanization chamber and the necessary corrections to the extruder settings can only be performed after the transit time which is dependent on the pipe section length, the cable dimensions and the nature of the heat transfer, which can take up to an hour or more.

Attempts have been made to overcome this disadvantage by measuring/technical determinations of the cable geometry by means of incorporated measuring devices operating with X-rays.

The direct connection of the vulcanization section to the extruder head provides certain advantages from the sealing standpoint, in that a seal is only required at the outlet from the vulcanization chamber and serves to prevent the outflow of the heat transfer medium. It is also known to arrange such a seal at the inlet to the chamber (DOS No. 2,626,721), so that the vulcanization chamber is separated from the extruder. At this point, a sealing liquid is used, the disadvantage being that for sealing gaseous or vaporous media, the cable must be turned, being guided away from the extruder with an upward inclination and then the cable must be turned again back in the pressure system inlet of the vulcanization chamber.

BRIEF SUMMARY OF THE INVENTION

The present invention now makes it possible to separate the two process stages, namely the coating stage and the crosslinking stage, no matter what the position of the vulcanization chamber and independently of whether crosslinking is carried out under the pressure of a gas, vapor or liquid medium. Thus, the separation of the vulcanization chamber from the extruder can be realized on conventional horizontal, vertical or catenoidal systems.

According to the invention, this is realized by the method for introducing cable into a vulcanization chamber, after leaving an extruder wherein a coating of crosslinkable material is applied to the cable, the vulcanization chamber being spaced from the extruder having an inlet opening and operating by the action of a heat transfer medium to crosslink the coating, comprising the steps of: passing the cable through a series of axially series-arranged sealing elements forming a sealing tube connected to the inlet opening, each element having a variable diameter opening; and, surrounding the coated cable with a leakage flow of the heat transfer medium out of the vulcanization chamber and through each of the openings, by individually adjusting the opening of each of the sealing elements, thereby substantially preventing damaging contact between the coated cable and the sealing elements. A corresponding apparatus for performing the method is also provided.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a diagrammatic view of the apparatus;

FIG. 2A is a longitudinal section through the sealing tube;

FIG. 2B is the pressure distribution in the sealing elements;

FIG. 2C is the pressure distribution in the gaps between the sealing elements;

FIG. 3 is a partial cutaway portion of FIG. 2A with a modified construction.

DETAILED DESCRIPTION OF THE PREFERRED EMBODIMENTS

Figure 4:
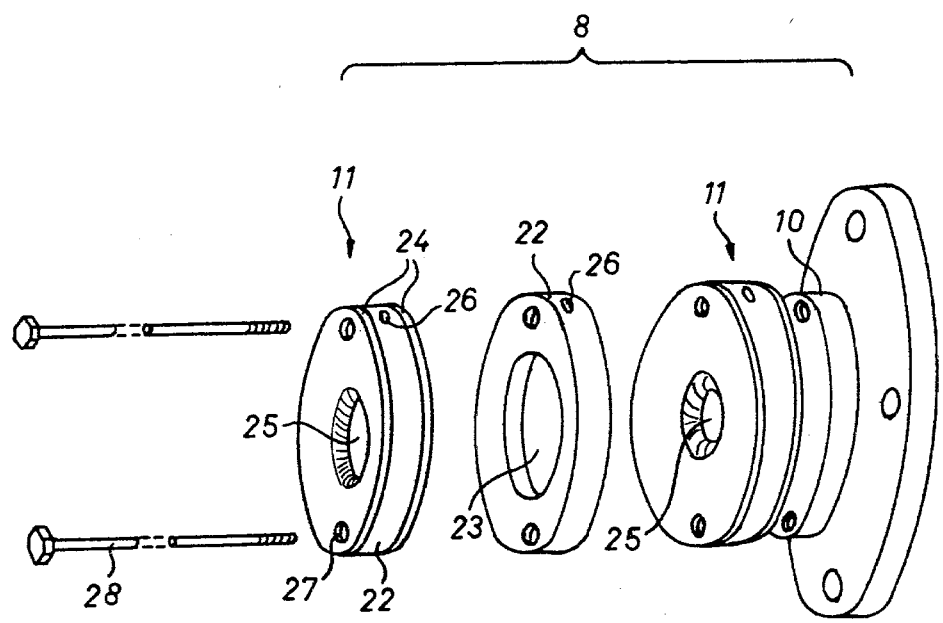
FIG. 4 is an exploded perspective view of the sealing tube.

FIG. 1 diagrammatically shows a cable coating apparatus with an extruder 1, which coats a conductor 2, which may have already been coated with one or more coatings by one or more other extruders. The coated cable 3 is discharged from the outlet orifice 4 of the extruder head 5. The coating which has just been applied is still very plastic and in order to prevent damage to the coating, the coated cable must pass into the crosslinking or vulcanization chamber 6 in contactfree manner. Once in the chamber, the applied coating is crosslinked by introducing a heat transfer medium supplied by a pipe 7.

Normally, the vulcanization chamber 6 is connected directly to the extruder head 5 which, as stated hereinbefore, makes it impossible to check the extrudate dimensions. Therefore, chamber 6 is removed from the extruder head by a distance X.

The separation of the vulcanization chamber 6 from the extruder 1 only involves the incorporation of a sealing tube which introduces the still plastic coating without deformation and preferably without contact into the chamber 6. Tube 8 also has the function of preventing the escape, from the inlet opening 9, of the heat transfer or pressure medium (gas, vapor or liquid) used for crosslinking, it being impossible to tightly seal the opening due to the entering cable.

A first embodiment of sealing tube 8, which is based on the principle of the multistage labyrinth packing, is shown in FIG. 2A. It is flanged to the vulcanization chamber 6 by means of an end piece 10 and has a plurality of hollow sealing elements 11, each having an elastic part. Details are described in conjunction with FIG. 4. Each sealing element 11 forms a chamber 12. Chambers 12 are arranged at intervals from one another, so that spaces 13 are formed there between. Branch lines 14 connect each chamber 12 with a main line 15, which is in turn connected to a pressure medium source 16, for example a compressor as shown in FIG. 1. The latter supplies the pressure which, as shown in FIG. 2B, can be predetermined for each chamber, whereby the pressure is lowest in the chamber 12 closet to the inlet to the sealing tube 8 and rises in stages from one chamber to the next. This progression is most easily achieved by adjustable, pressure reducing valves 17, one of which is individually disposed in each branch line 14. The value of the highest pressure $p_{in}$ in the last chamber is dependent on the operating pressure of the heat transfer medium in vulcanizing chamber 6, and since the number of sealing chambers 12 is a function of the length of tube 8, no measured values for the pressure $p_i$ can be given in FIG. 2B. The only requirement is that the pressure differences between one chamber and the next are approximately no greater than approximately 1 bar. If the operating pressure of the heat transfer medium is known, thus giving the value for the pressure $P_{in}$, it is possible to compute from this value for the maximum pressure difference, the necessary number of sealing elements 11, and consequently, the length of the sealing tube 8, which then extends up to a distance y on the extruder head 5.

It should be noted that dynamic pressures are involved. The pressure medium in main line 15 and in branch lines 14 does not therefore flow through them, so that in certain circumstances it may not be necessary to provide a discharge valve in main line 15 for releasing the pressure.

Thus, as shown in FIG. 2A the gaps 13 are connected by means of the various openings 25 (FIG. 4) of the sealing elements 11 with the intake opening 9 of the vulcanization chamber 6 and gaps 13 are therefore filled by the heat transfer medium which flows outwardly from opening 9, the pressure decreasing from one gap 13 to the next, as is known in connection with labyrinth packings. The pressure loss is shown in FIG. 2C, it being apparent that it always decreases through an annular clearance. The maximum value is in this case the same as the operating pressure of the heat transfer medium in the vulcanization chamber less any throttling losses on flowing out of the intake opening 9.

However, as shown in FIG. 3, it is also possible to pressurize the gaps 13, for which purpose a further main line 18 is provided which is connected to a pressure source 19 and from which branch lines 20 lead to the individual gaps. The branch lines 20 also contain pressure reducing valves or volume governors 21. In theory, it would be conceivable for the gaps 13 to be subject to the action of the same medium as chambers 12, so that then the branch lines 20 could also be connected to the main line 15. However, this does not occur in practice, because it is more advantageous to use a gas for chambers 12 and a liquid for gaps 13, which can advantageously have a lubricating action or can contain additives for this purpose, so that on any contact between cable 3 and chambers 12, the resulting friction is as low as possible.

As a result of the inflow of a pressure medium into gaps 13, it is possible to substantially or even completely prevent the outflow of heat transfer medium from intake opening 9 of vulcanizing chamber 6. All that flows out from the intake side of sealing tube through the outermost annular clearance into the open is the above-mentioned sealing medium. If it is liquid, means can be provided for collecting and returning it to the pressure source 19.

An exemplified construction of sealing tube 8 is shown in FIG. 4. Each sealing element 11 comprises a disk 22 with a central bore 23. Disk 22 is positioned in the slot of a spool-like ring 24 made from an elastic material and which has a substantially U-shaped cross-section, as can be seen in FIG. 2A. The spool-shaped rings 24 are made from a rubber-elastic material, for example silicone rubber which also has the property of being able to withstand permanent operating temperatures up to 180° C. As the internal diameter of disk 22 is significantly larger than the internal diameter of ring 24 or its opening 25 (FIG. 2A) the annular chambers 12 are formed there between. Each of the disks 22 has a circumferential bore 26 for the connection of the branch lines 14. All the disks 22 and the spool-shaped rings are provided with axially directly bores 27. Bolts 28 are passed through them and can then be screwed into terminal flange 10. There is an alternating arrangement of a disk 22 with a ring 24 and then a disk 22 without the ring, whereby the latter from the gaps 13 as shown in FIG. 2A.

In order to obtain maximum elasticity and minimum deformation forces in the sealing elements 11, it is necessary to make the wall thickness of the elastic rings 24 as small as possible. This is only possible if the lateral deflecting forces which act on them and which are caused by the pressure differences of the gaps 13 on either side of each sealing element 11 are kept to the minimum. Assume, for example, a maximum value of 1 bar as indicated hereinbefore. The progression of the pressure $p_i$ to $p_{in}$ in pressure chambers 12 should advantageously be in linear form in order to stress the sealing elements 11 as uniformly as possible. A desired leakage flow now takes place through the openings 25 and in turn builds up a pressure in gaps 13 which is dependent on the pressures in chambers 12. This leakage flow, controllable by the pressures in chambers 12, forms a small gap between cable 3 and sealing elements 11, thereby substantially preventing any mechanical friction of the cable on elements 11. Pressure changes in gaps 13 occur with diameter changes in cable 4. The sealing elements 11, characterized by their high deformability, adapt to the new conditions up to a state of equilibrium through the forces which act on them. The resulting increase in the leakage loss is generally unimportant and only rarely requires a pressure correction in chamber 12. In this connection, it is pointed out that by means of the same sealing elements, cables with up to 8 mm diameter differences and higher can be perfectly passed through the sealing tube 8.

Numerous advantages are obtained as a result of the represented method and/or apparatus. As a result of the use of the sealing tube 8 comprising a plurality of specially shaped sealing elements the leakage gap, i.e., the annular gap between the cable passing through the sealing tube and the edge of the openings 25 can be adjusted to changes such as diameter fluctuations and eccentricities of the cable axis (divergences from the circular shape of the cross-section) without there being any significant increase in the leakage loss. Due to the substantially contact-free sealing, there are also no geometrical deformations on the still deformable plastic cable 3. The size of the leakage gap is controllable by the preselectable pressure, as well as by the elastic properties of the sealing elements 11. Finally, there are only limited pressure differences upstream and downstream of each sealing element 11 due to the leakage flow of the heat transfer medium or the sealing medium which can optionally be introduced into the gaps 13 and consequently only limited lateral deflecting forces (i.e., in the axial direction of the sealing tube 8) on the particular sealing element, which can be absorbed without difficulty by ring 24 and its anchoring to the disk 22.

A further tube, which is in principle the same as sealing tube 8, could be provided at the outlet from vulcanization chamber 6 in order to also insure an excellent action there. At this point, the guidance of the cable is of limited importance because the coating applied has already been crosslinked. The length or number of sealing elements 11 in said tube need not necessarily be the same as in tube 8.

Applicant has found that water is a particularly useful sealing liquid when used in conjunction with steam as the heat transfer medium, i.e., the crosslinking agent. Alternatively, where the heat transfer medium is a gas, an ethylene glycol based on solution is effective as the sealing liquid.

The present invention may be embodied in other specific forms without departing from the spirit or essential attributes thereof, and accordingly, reference should be made to the appended claims, rather than to the foregoing specification, as indicating the scope of the invention.

I claim:

1. A method for introducing cable into a vulcanization chamber, after leaving an extruder wherein a coating of uncured crosslinkable material is applied to the cable, the vulcanization chamber being spaced from the extruder, having an inlet opening and operating by the action of a heat transfer medium to crosslink the coating, comprising the steps of:
    passing the cable through a plurality of annular inflatable sealing elements, axially aligned in series and together forming a sealing tube connected to the inlet opening, each sealing element having a variable diameter opening; and,
    surrounding the coated cable with a leakage flow of the heat transfer medium out of the vulcanization chamber and through each of the openings, by individually adjusting the diameter of each of the openings by inflating or deflating each of the sealing elements, thereby substantially preventing damaging contact between the uncured coated cable and the sealing elements.

2. The method of claim 1 wherein the cable coating is heated by thermally radiating the vulcanization chamber, in conjunction with a gas pressure cushion.

3. The method of claim 1, further comprising the step of introducing a sealing medium into the sealing tube, in order to augment the leakage flow.

4. The method of claim 3, wherein the sealing medium is a liquid.

5. The method of claim 4, wherein the liquid has at least one additive with lubricating characteristics admixed therewith in order to make surfaces of the openings of the sealing elements and the cable surface relatively and smoothly slidable.

6. The method of claim 1, further comprising the step of adjusting the openings of the sealing means such that pressure in the sealing tube is maximum adjacent the inlet opening, and progressively decreases along the tube.

7. The method of claim 4, wherein the liquid has lubricating characteristics.

8. The method of claim 6 wherein the maximum pressure drop between adjacent sealing means does not exceed 1 bar.

9. An apparatus for introducing a cable into a vulcanization chamber, after leaving an extruder wherein a coating of a uncured crosslinkable material is applied to the cable, the vulcanization chamber being spaced from the extruder, having an inlet opening and operating by the action of a heat transfer medium to crosslink the coating, comprising:
    a sealing tube positioned in front of the inlet opening;
    a plurality of axially arranged, annular inflatable sealing means disposed in the tube, each of the means being elastically deformable and having a variable diameter opening through which the coated cable can pass; and,
    means for adjustably supplying a pressurized medium to each of the sealing means to vary the diameter of each of the openings and surrounding the cable with a leakage flow of the heat transfer medium out of the vulcanization chamber and through the openings, thereby substantially preventing damaging contact between the uncured coated cable and the sealing means.

10. The apparatus of claim 9, wherein each of the sealing means comprises a peripheral chamber, each having a passage and further comprising branch lines connected to each of the passages for supplying the pressurized medium to the chambers.

11. The apparatus of claim 10, further comprising a pressure reducing valve in each of the branch lines, and a feed line for connecting the branch lines to a pressure source.

12. The apparatus of claim 11, wherein the pressure reducing valves are adjusted in such a way that the pressure is maximum in the chamber adjacent to the intake opening of the vulcanization chamber zone and from there progressively decreases from one chamber to the next.

13. The apparatus of claim 7, wherein the pressure drop from one chamber to the next does not exceed 1 bar.

14. The apparatus of claim 9, wherein the sealing means are spaced from one another.

15. The apparatus of claim 14, wherein the gaps between the sealing means are individually connected to the same pressure line as that for the sealing means.

16. The apparatus of claim 15, wherein the pressure medium for the gaps is a pressure-regulated or volume-regulated gas.

17. The apparatus of claim 15, wherein the pressure medium for the gaps is a pressure-regulated or volume-regulated liquid, which can also be used as a cooling liquid and which is compatible with the extruded-on layer of the cable and also with the heat transfer medium which has trickled into the gaps.

18. The apparatus of claim 9, wherein the elastically deformable material is a silicone rubber, which withstands permanent operating temperatures up to 180° C.

19. The apparatus of claim 17, wherein the liquid is water and the heat transfer medium is steam, as the crosslinking agent.

20. The apparatus of claim 17, wherein the liquid is based on ethylene glycol and the heat transfer medium is gas, as the crosslinking agent.

21. The apparatus of claim 14, further comprising another set of branch lines for connecting each of the gaps with another pressure medium, a pressure reducing valve being disposed in each of the another set of branch lines.

* * * * *